Patented Apr. 7, 1925.

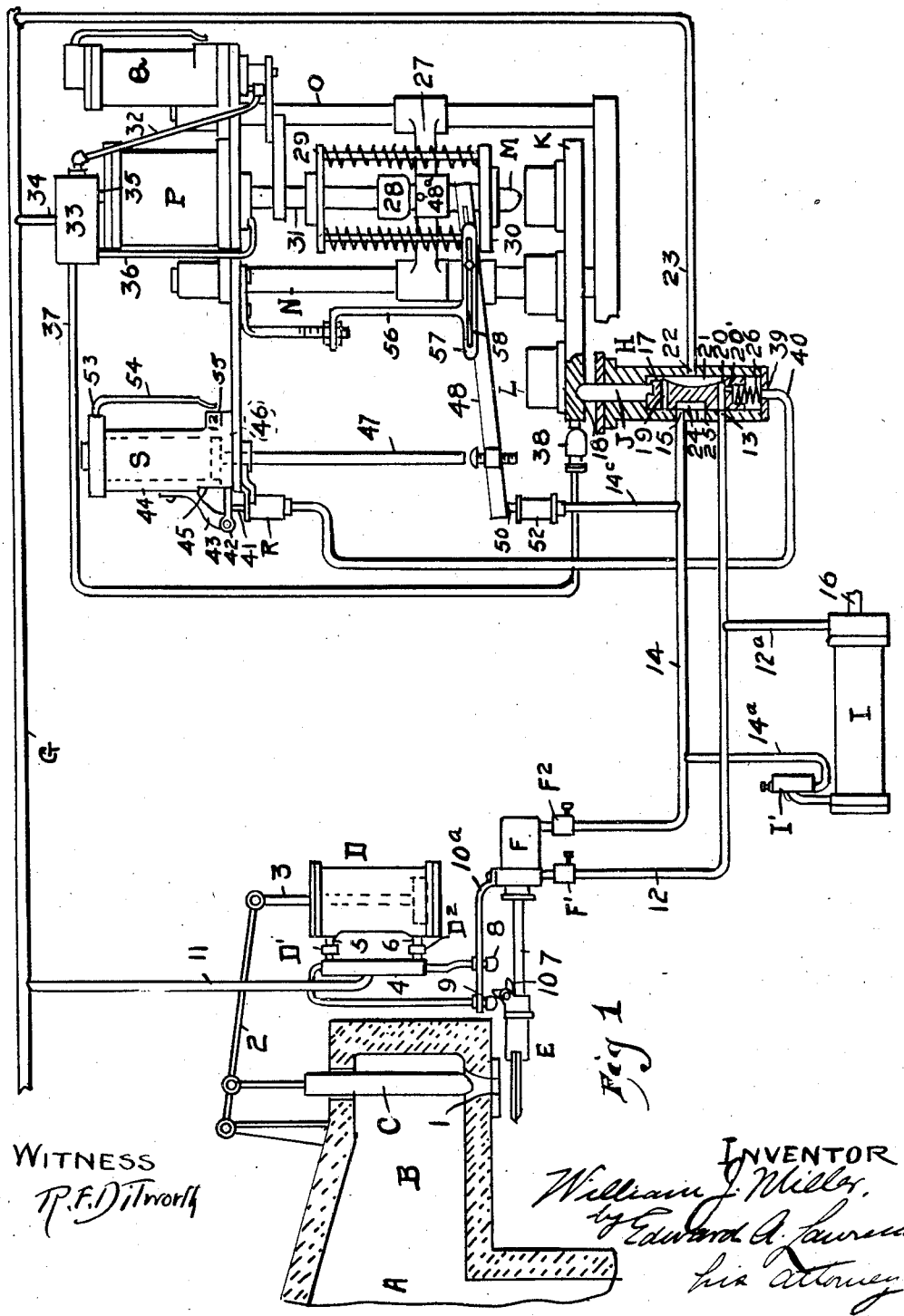

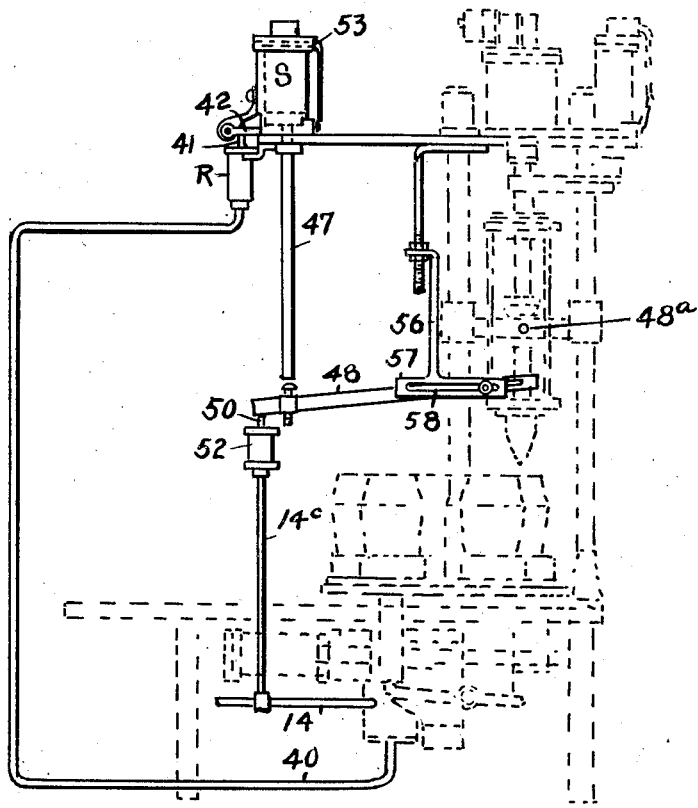

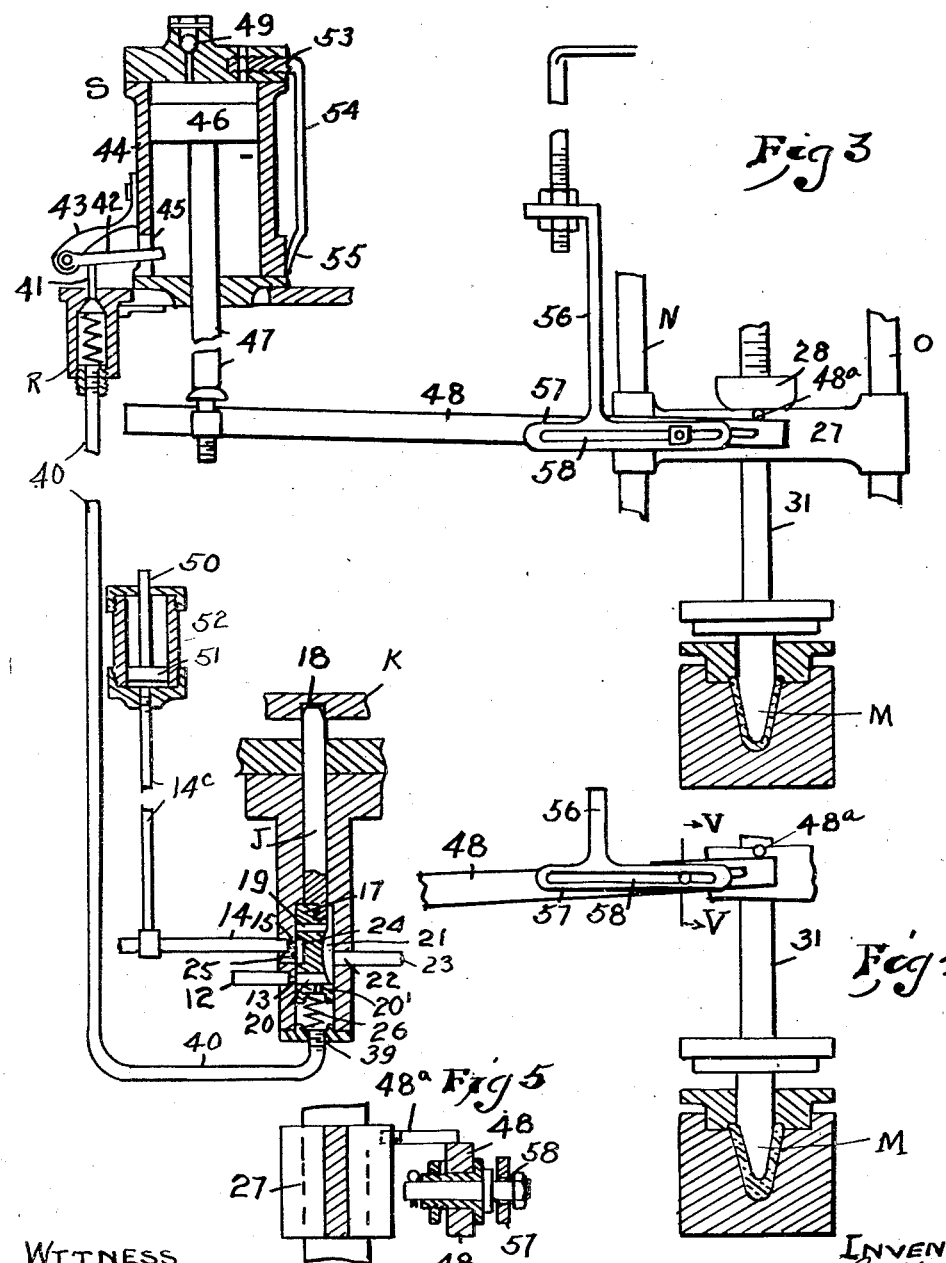

1,532,254

UNITED STATES PATENT OFFICE.

WILLIAM J. MILLER, OF SWISSVALE BOROUGH, PENNSYLVANIA.

PROCESS AND APPARATUS FOR CONTROLLING THE FEEDING OF GLASS.

Application filed November 21, 1921. Serial No. 516,645.

*To all whom it may concern:*

Be it known that I, WILLIAM J. MILLER, a citizen of the United States, and residing in the Borough of Swissvale, in the county of Allegheny and State of Pennsylvania, have invented or discovered the new, useful, and Improved Process and Apparatus for Controlling the Feeding of Glass, of which the following is a specification.

My invention consists of an improved process and apparatus for the control of the feeding of glass to glass-fabricating machines, and for like purposes.

In the use of automatic glass feeders considerable difficulty is experienced in maintaining a uniform weight or amount of glass in the gathers.

This irregularity is due to several causes. Thus, for instance, variations in temperature of the glass in the feeder boot occur from time to time, and normally the body of glass in the boot is composed of strata and zones of different temperatures; so that the glass discharged to form a gather or several successive gathers may be either hotter or colder than the glass in the previous gathers. Inasmuch as the temperature of the glass affects its rate of travel through the discharge orifice, the result is that one gather or several successive gathers may be "overcut" or too large while others may be "undercut" or too small, resulting in a very objectionable variation in the finished ware.

The object which I have in view is the automatic regulation of the size of the gathers so that a substantial uniformity may be maintained.

I obtain this uniformity by controlling the amount of glass in each gather by means of the amount of glass in a gather previously produced. In other words I utilize the excess or deficiency of glass in a gather already produced to reduce or increase by the proper amount the quantity of glass in the gather being formed. For instance I may utilize the variations of the degree of insertion of the pressing plunger or tool, which in a pressed ware machine forms the finished ware, and in a blown ware machine forms or helps to form the blank or parison from which the finished article is subsequently completed in the blow mold.

Thus, when an overcut gather is being pressed, the pressing plunger enters the mold to a less degree than it does when a gather of the normal or proper weight is pressed; and when an undercut gather is being pressed, the plunger enters the mold to a greater degree than it does when the gather is of the proper weight. I use these variations of plunger insertion to automatically control the amount of glass in the succeeding gather, so that the gather following an overcut gather will contain a reduced amount of glass, while a gather following an undercut gather will contain an increased amount of glass.

For this purpose I provide convenient apparatus, the principles of which are hereinafter illustrated by means of a practical embodiment.

To illustrate the principles of my present invention, I have shown the same applied to a glass pressing machine provided with fluid pressure table-rotating and locking mechanism and pressing plunger operating mechanism of the type shown and described in Letters Patent of the United States No. 1,130,920, granted to me March 9th, 1915, the pressing plunger being controlled by a timer of the type shown and described in Letters Patent of the United States No. 1,130,918, granted to me on March 9th, 1915; to which gathers of glass are supplied by an automatic feeder of the plunger type adapted to form gobs.

In this embodiment of my invention I have shown the feeder timed by the automatic valve connected to the table locking member, and the release of the table locking member and the actuation of the table rotating mechanism timed by the degree of insertion of the pressing plunger in the molds.

In the accompanying drawings, which are however merely intended to illustrate a practical embodiment of the principles of my invention without limiting the scope of the same to the construction shown, Fig. 1 is a diagrammatic view showing the feeder and parts of the pressing machine together with the fluid pressure connections for the same; Fig. 2 is a side elevation of the glass pressing machine, showing the pressing plunger control of the table locking and rotating mechanism, the pressing plunger being shown raised; Fig. 3 is an enlarged view showing the pressing plunger inserted in a press mold in pressing an undercut gather, the table control mechanism being shown diagrammatically; Fig. 4 is a similar view showing the pressing plunger inserted in a press mold in pressing an overcut gather, and Fig. 5 is a sectional view along the line V—V in Fig. 4.

The following is a detailed description of the drawings:

A is a glass tank provided with a shallow extension or boot B having a bottom discharge orifice 1. The discharge of glass through said orifice is controlled by means of a vertically disposed plunger C suspended from a walking beam 2 which is raised and lowered by means of the piston rod 3 of the fluid pressure cylinder D which is provided with an automatic valve 4 connected to its opposite ends by the pipes 5 and 6. D' and D² represent cushion valves interposed respectively, in the pipes 5 and 6 to retard the escape of fluid pressure from the corresponding ends of said cylinder, said valves being made adjustable whereby the speed of the movement of the piston in either direction in said cylinder may be regulated. The construction of a suitable cushion valve for this purpose is fully described in my pending patent application, serial number 331,018, filed October 16th, 1919.

E represents a pair of oscillating shear blades operating beneath the orifice 1 and actuated in any convenient manner, as by the piston rod 7 of the fluid pressure cylinder F; the extension of said piston rod being assumed to advance the shear blades to a position beneath the orifice 1 and close said blades, together, while the retractive movement of said piston rod causes said blades to open and move from beneath the orifice.

The automatic valve 4 of the plunger cylinder D is operated by means of a pair of hooded bleeder valves 8 and 9 connected by pipes to the opposite ends of the valve casing; and said bleeder valves are actuated by the shear operating mechanism. Thus I have shown said bleeder valves interposed in the path of a latch 10 on the piston rod 7, so that during the extension movement of said piston rod, said bleeder valves are in turn momentarily opened, so that said automatic valve is first shifted to admit pressure to the upper end of cylinder D, and thereby depress the plunger C, and then shifted to admit pressure to the lower end of the cylinder D, and thereby start the elevation of the plunger C just before the shears close to sever the neck of glass by which the gather or gob is suspended from the orifice 1. The latch 10 is pivotally mounted on the piston rod 7, so that during the retractive movement of the piston rod, said latch will trail idly over the bleeder valves without operating the same. The bleeder valves are adjustable as to their positions relative to the latch 10 and to each other. Thus I show them mounted on a slotted bracket 10ᵃ extending from the head of cylinder F, said bleeder valves being clamped at any desired positions along the slot of the bracket.

The constant fluid pressure port of the automatic valve 4 is connected by a pipe 11 with the supply pipe G in which a uniform pressure is maintained.

Thus, the discharge orifice 1 being open for the outward flow of glass, as the piston rod 7 is extended, it first causes the plunger to descend, increasing the discharge of the glass, and then, just before the shears close to sever the gather or gob, the plunger is caused to start upward, thereby completing the "necking" of the gob and thus facilitating shearing, and lifting the sheared stub off the shears.

The front end of the shear cylinder F is connected by a pipe 12 to the port 13 in the casing of an automatic valve H, and 14 is a pipe connecting the rear end of said cylinder with the port 15 of said valve casing. Adjacent to the cylinder F, said pipes 12 and 14 are provided with adjustable cushion valves F' and F², respectively whereby the speed of travel of the piston rod 7 may be nicely regulated.

I do not herein show or describe in detail the mechanism for intermittently rotating and locking stationary the mold table, as the same will be found fully shown and described in my said Letters Patent No. 1,130,920. I therefore herein simply show and describe the table locking pin and the table rotator cylinder for the sake of brevity.

Thus I is the table rotating cylinder which rotates the table by the extension movement of its piston rod 16 and the retraction of its piston rod is accomplished while the table is locked stationary. The rear end of said cylinder I is connected by a pipe 14ᵃ with the pipe 14, a suitable retarding valve I' being preferably interposed in the pipe 14ᵃ, whereby the shifting of the table is delayed until the plunger and shears have formed and severed the gob which drops into the waiting mold. The structure of said retarding valve is shown and described in my said Letters Patent 1,130,920. The forward end of the cylinder I is connected to the pipe 12 by the pipe 12ᵃ.

The automatic valve H is provided with a sliding body 17 whose upper end is coupled or otherwise connected to the locking pin J which is adapted to be extended upwardly into engagement with one of an annular series of locking recesses 18 arranged concentrically in the under side of the rotary mold table K upon which are mounted the molds L.

The valve body 17 is provided with a pair of spaced apart diametric passages 19 and 20 connecting at one end with a recess 21 in the valve body which is always in communication with the port 22 in the valve casing, which port is connected by the pipe 23 with the pressure supply pipe G.

When the locking pin J is in its raised or locking position, as shown in Figs. 1 and 3, the passage 20 is in registration with the port 13 in the valve casing, this supplying fluid pressure to the front end of the shear cylinder F and the front end of the table rotating cylinder I. When the pin J is depressed out of its locking position, the passage 19 of the valve H is in registration with port 15, thus admitting pressure to the rear end of the cylinder F and to the rear end of the cylinder I. 24 is a recess in the valve body 17 opposite the recess 21 and so located as to connect the port 15 to an escape port 25 open to atmosphere, when the passage 20 registers with the port 13, and, on the other hand, connecting the port 13 with the escape port 25 when the passage 19 registers with the port 15, thus releasing the pressure in one end of the cylinders when pressure is admitted to the other end of the cylinders.

The lower end of the valve body is recessed to receive the upper end of the balance spring 26 which tends to hold the valve in its upper position, and 20' is a small bleeder passage connecting the recess 21 to the lower end of the valve body 17 to gradually replenish the pressure, after pressure has been temporarily relieved under the valve body, as will be later described.

M is the pressing plunger mounted on cross head 27, sliding on the standards N and O, a clamping nut 28 holding the plunger in position. 29 is the spring frame of the mold ring 30. 31 is a piston rod attached at its lower end to the cross head 27 and at its upper end to the piston working in the cylinder P mounted on the standards N and O. Q represents a timer which may be of the type described in said Letters Patent 1,130,918, and which times the dwell of the pressing plunger M in the mold and starts it upwardly after the article is pressed. Said timer is connected by a pipe 32 to the one end of the casing of the automatic valve 33, which valve is connected by the pipe 34 with the fluid pressure supply pipe G, and by pipes 35 and 36 with the opposite ends of the cylinder P. The other end of the valve casing is connected by a pipe 37 with a bleeder valve 38 temporarily opened by the table K just before it reaches the end of a rotary movement, thus reversing the automatic valve 33 and starting the pressing plunger on its down stroke.

The lower end of the casing of automatic valve H is provided with a pressure relief port 39 which is connected by the pipe 40 with a bleeder valve R. Said bleeder valve is spring closed and its upwardly protruding valve stem 41 supports a lever 42 pivotally attached at its outer end to the bracket 43 extending from the cylinder 44 of the timer S.

The cylinder 44 is provided at its lower end with a vertical slot 45 through which the free end of the lever 42 protrudes in the path of the timer piston 46. Thus as the piston 46 approaches the end of its descent, it opens the bleeder valve R, thus relieving pressure in the lower end of the automatic valve H, thereby permitting the pressure to force down the valve body 17 from the position shown in Figs. 1 and 3 into a position wherein the passage 19 registers with the port 15 and pipe 14, while the passage 20 moves out of registration with the pipe 12, which pipe then is connected to the relief ports 25 through the recess 24. Thus the pressure is admitted to the rear end of the shear cylinder F, and relieved from its front end closing the shears and cutting off the suspended gather or gob, and permitting it to drop into the waiting mold. The pressure is also, but with a lag owing to the retarding valve I', introduced into the rear end of the cylinder I and relieved from its front end, thereby causing the unlocked table to rotate to its predetermined extent, thus spotting the mold, into which the gob has been dropped, under the pressing plunger M, and spotting an empty mold under the feeder orifice 1. The shear closing movement of the piston rod 7, by operating the bleeder valves 8 and 9 causes the plunger C to first descend and then to start to rise before the shear closes thus attenuating the neck of the gob to facilitate shearing. The elevation of the pressing plunger is, as has been stated, controlled by the timer Q.

47 is a piston rod depending from the piston 46 through the lower head of the cylinder 44 and adapted to be struck from beneath by the longer end of a rocking lever 48 whose short end is in the path of the pin 48$^a$ or some other projecting portion of the pressing plunger mechanism, so that as the plunger approaches the mold the short end of the lever 48 will be depressed and the long end elevated, raising the piston 46 as shown in Fig. 3. The upper end of the cylinder 44 is provided with an outwardly opening ball valve 49 to permit the free escape of air in front of the rising piston. When the pressing plunger M rises the long end of the lever 48 drops permitting the piston 46 to descend until it once more pushes down the lever 42 and opens the bleeder valve R with the results already described.

To prevent the bleeder valve being held open, I provide a push rod 50 attached to the piston 51 of a cylinder 52 and extending up through the upper end of said cylinder. The bottom of said cylinder is connected by a pipe 14ᶜ with the pipe 14, so that when the valve body 17 drops in response to the opening of the bleeder valve R by the descent of the piston 46, pressure is admitted to the lower end of the cylinder 52, thus forcing up the rod 50, and slightly elevating the long arm of the lever 48 so as to raise the piston 46 off the lever 42 and thus permit the bleeder valve R to close.

It will be understood that when the bleeder valve R is closed, pressure will build up under the valve body 17, the same being gradually admitted through the bleeder passage 20' until, when the depressed locking pin is unlatched at the end of the forward movement of the table, as fully explained in my said Letters Patent 1,130,920, the combined power of the accumulated pressure under the valve body 17 and of the spring 26 will cause the valve body 17 to rise into the position shown in Figs. 1 and 3, thus engaging the locking pin J with the locking recess 18 now alined with it, and also admitting pressure into the front ends of the cylinders F and I, thus retracting and opening the shears E, permitting the gravity flow of glass for the formation of the next gob and causing the table operating mechanism to retreat in its idle stroke.

When next, by the opening of the bleeder valve R, as already described, the pressure is admitted to the rear end of the cylinder F, the piston rod 7 starts its extension stroke, the plunger C is first depressed and then raised to neck the gob and the shears then close, severing the gob which drops into the mold which has been held in position because of the lag provided by the retarding valve I'. The table now rotates to spot the filled mold in the pressing position.

Thus the opening of the bleeder valve R, by shearing the depending gob and then starting the mold table to rotate, terminates the gob forming operation, and by advancing or delaying the termination of the period during which glass is discharged by gravity before the descent of the plunger, the amount of glass in the gob may be regulated. The termination of the gob forming operation is, as has been explained, caused by the descent of the piston 46 in the timer cylinder 44, and therefore the farther the piston has to drop, the longer will the gravity flow of glass be prolonged, and the larger will be the gob. Thus when the gob being pressed is undercut, as illustrated in Fig. 3, and therefore it is desired to increase the amount of glass in the next gob, the plunger in pressing the glass in the mold descends farther than it would in the case of a properly sized gob, thereby depressing the short end of the lever 48 to a greater degree and thus raising the timer piston 46 a greater distance in the cylinder 44, so that said piston will consume a longer time in its next descending movement, thus delaying the severing of the next gob and thereby increasing its weight to correct the undercutting which was evidenced in the gob now being pressed. On the other hand, when an overcut gob is pressed, the pressing plunger does not enter so far into the mold, and therefore the timer plunger is not elevated to so high a point and consumes less time in its next descent, thereby shortening the gob forming period and reducing the amount of glass in the next gob to correct the overcutting. When a gob of the proper weight is pressed the piston 46 is elevated to the proper degree to consume the proper time in its descent to permit the formation of a second gob of the same amount of glass.

While the ball valve 49 permits the air to freely escape from the upper end of the cylinder 44 when the piston 46 is raised, the reentrance of air above the descending piston is retarded by means of a rotary inlet valve 53, so that the speed of the descent of the piston may be regulated by adjusting said rotary valve. 54 is a pointer attached to the stem of said rotary valve and which moves over a graduated dial plate 55 so that the operator may readily adjust said valve to obtain the proper speed of descent for the piston.

The rocking lever 48 may be fulcrumed in any convenient manner.

Thus I have shown a hanger 56 depending from the standard N and adjustable in length. The lower end of said hanger is provided with a horizontally extended portion 57 provided with a slot 58, whereby the fulcrum point of said lever may be adjusted to get the necessary art of movement of the long end of the lever. The hanger may also be raised or lowered to get the proper elevation of the fulcrum point.

It is evident from the foregoing that by the use of the principles of my invention gob sizes may be controlled within exceedingly narrow limits—indeed within much narrower limits than in the case of hand feeding. This makes possible a most advantageous uniformity of ware.

I have for the sake of illustration shown the principles of my invention applied to a plunger type gob feeder supplying a pressed ware machine, but it will be apparent to those skilled in the art that the invention is applicable to the automatic feeding of glass in general, and is not confined to use in connection with fabricating machines of any type.

Although, for the sake of clearly illustrating the principles of my invention, I have minutely described the embodiment of the same shown in the drawings, I do not limit myself thereby but claim broadly:—

1. The process of maintaining uniformity in gathers of glass produced by an automatic feeder which consists in regulating the amount of glass in a gather being formed by the feeder by the amount of glass in a preceding gather.

2. The process of maintaining uniformity in gathers of glass produced by an automatic feeder which consists in using the variation in a gather already formed to regulate the amount of glass in a gather being formed by the feeder.

3. The process of maintaining uniformity in gathers of glass produced by an automatic feeder which consists in using the excess or deficiency of glass in a gather already formed to reduce or increase the amount of glass in the gather being formed by the feeder.

4. The process of maintaining uniformity in gathers of glass produced by an automatic feeder supplying gathers to a fabricating machine which consists in using the variation in a gather being fabricated to correct the amount of glass in the gather being formed by the feeder.

5. The process of maintaining uniformity in gathers of glass produced by an automatic feeder supplying a fabricating machine which consists in using the excess or deficiency of glass in a gather being fabricated to control inversely the amount of glass in the gather being formed by the feeder.

6. The process of maintaining uniformity in gathers of glass produced by an automatic feeder supplying a fabricating machine which consists in using the excess or deficiency of glass in a gather being fabricated to reduce or increase the amount of glass in the gather being formed by the feeder.

7. The process of maintaining uniformity in gathers of glass produced by an automatic feeder supplying a fabricating machine which consists in using the degree of insertion of the forming member of the fabricating machine into the mold to fabricate a gather to control the amount of glass in the gather being produced by the feeder.

8. In combination with an automatic glass feeder, means for utilizing the amount of glass in a gather previously formed by the feeder to control the amount of glass in the gather being formed by the feeder.

9. In combination with an automatic glass feeder, means for utilizing the excess or deficiency of glass in a gather already formed by the feeder to reduce or increase the amount of glass in the gather being formed by the feeder.

10. In combination with an automatic glass feeder and a fabricating machine provided with a mold and a forming member entering said mold to fabricate the gathers supplied by said feeder, means whereby the degree of insertion of said forming member into said mold to fabricate a gather is utilized to control the amount of glass in the gather being formed by the feeder.

11. In combination with an automatic glass feeder and a fabricating machine provided with a mold and a forming member entering said mold to fabricate the gathers supplied by said feeder, means whereby the greater or less degree of insertion of said forming member into said mold to fabricate a gather due to the deficiency or excess of glass in said gather is utilized to increase or reduce the amount of glass in the gather being formed by the feeder.

12. The method of controlling the feeding of glass charges to molds, which method comprises measuring the volume of a charge fed and then regulating the volume of succeeding charges by the variation of the measured charge from predetermined limits.

13. The method of controlling the feeding of glass charges to molds, which method comprises measuring the volume of a charge fed during a forming operation on the charge and then regulating the volume of a succeeding charge by the variation of the measured charge from a predetermined limit.

14. The method of controlling the feeding of glass charges to molds, which method comprises feeding a charge into a mold, measuring the volume of a charge fed and then regulating the volume of succeeding charges by the variation of the measured charges from predetermined limits.

15. The method of controlling the feeding of glass charges to molds, which method comprises feeding a charge into a mold, measuring the volume of a charge fed during a forming operation on the charge and then regulating the volume of a succeeding charge by the variation of the measured charge from predetermined limits.

16. The method of controlling the volume of glass charges fed to molds, which method comprises measuring the volume of a charge in a mold, indicating the variation of said measurement from a predetermined quantity, then controlling the volume of succeeding charges according to said variation.

17. The method of regulating a glass feeder that comprises varying the delivery of glass by said feeder into automatic response to variation in the quantities of glass delivered by said feeder.

18. The method of regulating a glass feeder that comprises varying the delivery of glass by said feeder in automatic response to variation in the weight of ware made from mold charges delivered by said feeder.

19. The method of regulating the weight of mold-charges delivered by a glass feeder that comprises varying the rate at which the glass is delivered by the feeder in automatic response to variations in the weight of articles formed from mold-charges previously delivered by said feeder.

20. Apparatus for regulating a glass feeder comprising a movable member adapted, by its movement, to vary the delivery of glass from said feeder, means for ascertaining the quantity of glass contained in mold-charges delivered by said feeder, and means, automatically operable, in response to abnormal actuation of said ascertaining means, for moving said movable member.

Signed at Pittsburgh, Pa., this 3rd day of June, 1921.

WILLIAM J. MILLER.